United States Patent Office 3,232,927
Patented Feb. 1, 1966

3,232,927
WATER SOLUBLE ORGANIC DYESTUFFS
David Irwin Randall, New Vernon, and Wilhelm Schmidt-Nickels, Little York, N.J., assignors to General Aniline & Film Corporation, New York, N.Y., a corporation of Delaware
No Drawing. Filed Dec. 31, 1962, Ser. No. 248,242
11 Claims. (Cl. 260—163)

This invention relates to a novel fiiber-coloring process, and to a novel group of chromophoric compounds useful in such process.

A number of dyeing processes are known in which dyeings of improved fastness properties are obtained by reaction between the dyestuff and the fiber. Among the large number of types of reactive dyes proposed for use in such processes, only a few are commercially useful. These are the cyanuric, the pyrimidine, and the vinylsulfone or sulfatoethylsulfone types. Because of the relative scarcity of such dyestuffs and/or their substantial unavailability to large sections of the dyeing trade and/or various disadvantages inherent in their use with respect to procedure, cost, and/or results obtained, there exists a definite need in the industry for new and improved types of reactive dyestuffs and/or methods of dyeing therewith.

It is an object of this invention to provide a novel process for coloring fibers and other articles in any desired shades of improved fastness properties. Another object of this invention is the provision of a novel group of chromophoric compounds useful in such process. Still another object of this invention is the provision of methods for making such chromophoric compounds. A further object of this invention is the provision of novel colored fibers. A still further object of this invention is the provision of such processes, compounds, and colored products, which will not be subject to one or more of the above disadvantages and which depend upon a reaction between the chromophoric compound and the fibers. Other objects and advantages will appear as the description proceeds.

The attainment of the above objects is made possible by this invention which is based upon the discovery that colored fibers with improved properties can be obtained by treating fibers containing a reactive hydrogen atom in the presence of an acid binding agent with an organic dyestuff containing in the molecule at least one radical which is bonded to a nuclear carbon atom and which has the formula (I) 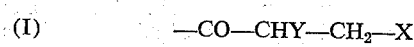 —CO—CHY—CH$_2$—X wherein Y is selected from the group consisting of H, Cl and Br, and X is the anion of a strong acid having a dissociation constant greater than $2.0 \times 10^{-5}$. The fiber-reactive radical shown in the above formula has been found to be unexpectedly effective in enabling reaction of chromophoric compounds (including dyestuffs per se) containing the same with fibers containing a reactive hydrogen atom in the fiber molecule with liberation of HX and the production of colored fibers with improved properties with respect to fastness to such deteriorating influences as wet treatments, alkaline and acid conditions, laundry sours, chlorine, and/or light and the like. The present invention accordingly not only resides in the provision of the foregoing process and the colored fibers resulting therefrom, but also in the provision of the chromophoric compounds useful in such process.

As a chromophoric compound into which such fiber-reactive radical or radicals may be inserted in accordance with this invention there may be employed any known organic dyestuff. Such dyestuffs are generally aromatic character in containing at least one carbocyclic or heterocyclic ring, and may generally be selected from among dyestuffs of the azo, quinoid (including anthraquinone, dibenzanthrone, other polycyclic ketones and substituted derivatives thereof), indigoid, thioindigoid, di- and triaryl (e.g. phenyl) methane, nitro, phthalocyanine, stilbene, and sulfur dyestuffs. Venkataraman's "Chemistry of Synthetic Dyes," Academic Press, N.Y., 1952, volumes I and II, discloses a multitude of such organic dyestuffs into which such fiber-reactive radicals of the formula shown above can be inserted in known manner. Further examples of dyestuffs into which the above defined fiber-reactive radicals may be inserted are also disclosed generically and specifically in, for example, U.S. Patents 2,657,205, 2,892,670, 2,892,671, 2,928,711, 2,940,812, 2,978,289, 3,029,123, 3,031,252, and 3,042,477, and such disclosures, so far as they relate to chromophoric compounds or dyestuffs into which fiber-reactive groups may be inserted, are incorporated herein by reference thereto.

Optionally, the chromophoric compounds into which the above defined fiber-reactive radical is inserted may be colorless compounds containing groups enabling conversion to colored compounds or dyestuffs in situ on the fiber, as for example, a group promoting couplnig with a diazotized primary aromatic amine or a diazotizable primary amine group whereby the color may be produced in situ on the fiber after reaction of the fiber-reactive radical-containing chromophoric compound with the fiber by suitable development as by, respectively, reaction with a diazotized primary aromatic amine or diazotization and reaction with a coupling component. Other mechanisms and/or groupings are of course known for developing color in situ on the fiber, including metallizing, reducing and/or oxidizing treatments and the like. It is to be understood that such colorless compounds are to be considered equivalent to the above described dyestuffs in carrying out the teachings of this invention.

In the above defined fiber-reactive radical Y is preferably H but may instead be Cl or Br. It will be understood however that one or more of the depicted carbon-bonded hydrogens may be substituted by lower alkyl of 1 to 4 carbon atoms, the corresponding acetylenically unsaturated alkyls (alkynyl), the corresponding ethylenically unsaturated alkyls (alkenyl), benzyl, cycloalkyl, such as cyclohexyl and cyclopentyl, phenyl, naphthyl, heterocyclic such as furyl, which inert substituents may be further substituted or chain-interrupted by other inert groups or hetero atoms.

In the above formula for the fiber-reactive radical, X is an ester group derived from the anion of a strong acid having a dissociation constant greater than $2.0 \times 10^{-5}$ and is preferably Cl or sulfato (—OSO$_3$H). Alternatively, X may represent the anion of any other such strong acid such as the anions of hydrobromic, hydrofluoric, iodic, phosphoric, phosphonic, phosphinic, organic sulfonic (sulfonyloxy), trichloroacetic, dichloroacetic, chloracetic, formic acids and the like.

Bonding of the above described fiber-reactive radical to a nuclear carbon atom of an organic dyestuff, chromophoric compound, or aromatic hydrocarbon may be conveniently carried out by a Friedel-Crafts reaction with β-chloropropionyl chloride or α,β-dichloropropionyl chloride (or the corresponding bromine-substituted compounds) in the presence of anhydrous aluminum chloride and an inert organic solvent such as tetrachloroethane or other aliphatic hydrocarbon or halogenated hydrocarbon. This reaction is suitable for the treatment of chromophoric compounds and dyestuffs resistant to Friedel-Crafts reaction conditions such as the phthalocyanines, as for example copper phthalocyanine, and vat dyestuffs as for example dibenzanthrone. Another and preferred expedient for use in the production of chromophoric compounds and dyestuffs sensitive to Friedel-Crafts reaction conditions invloves reaction of the β-chloropropionyl chloride in similar manner with an aromatic compound such as benzene, diphenyl, diphenyl ether, naphthalene, anthracene, and lower alkyl and alkoxy substituted derivatives thereof (1 to 4 carbon atoms), and the like containing a nuclearly substituted protected amino group such as an acetylamino group or the like. Such a reaction proceeds for example, according to the following equation wherein Ar represents such aromatic compound:

(II)

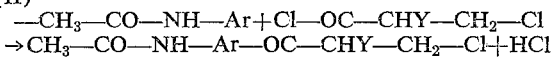

—CH₃—CO—NH—Ar+Cl—OC—CHY—CH₂—Cl
→CH₃—CO—NH—Ar—OC—CHY—CH₂—Cl+HCl

The above reaction is, as stated, carried out in the presence of anhydrous aluminum chloride and in an inert oragnic solvent. The intermediate resulting from the above reaction is then subjected to acidic hydrolysis conditions as for example by boiling with hydrochloric acid to produce the corresponding free amino-containing compound of the formula:

(III)    H₂N—Ar—OC—CHY—CH₂—Cl

The above intermediate of Formula III may be employed in a number of different ways in carrying out the teachings of the present invention. For example, it is readily diazotized and coupled in known manner with any desired azo coupling component, a multitude of which are known in the art and disclosed for example in the above cited Venkataraman reference, to produce azo dyestuffs of the formula:

(IV)    B—N=N—Ar—OC—CHY—CH₂Cl

wherein B is the residue of the azo coupling component. The resulting azo dyestuff is readily reacted with fibers containing a reactive hydrogen atom in the presence of an acid binding agent with liberation of HX and the production of colored fibers represented by the formula:

(V)    B—N=N—Ar—OC—CHY—CH₂—Fiber

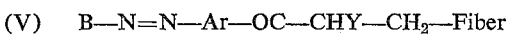

wherein "Fiber" represents a reactive hydrogen-containing fiber molecule deprived of said reactive hydrogen atom. It will be understood that more than one up to an average of four or more fiber-reactive radicals may be inserted in the aromatic or chromophoric compound by employing the requisite number of moles of the β-chloropropionyl chloride reactant per mole of chromophoric or aromatic compound. Dyestuffs or chromophoric compounds containing a plurality of fiber-reactive radicals, when applied to fibers in accordance with the present invention enable the attainment of further improved fastness properties in the colored products due to cross-linking between the fibers. In general, the colored fibers produced by the present process may be represented by the formula:

(VI)    D(—CO—CHY—CH₂—Fiber)ₙ

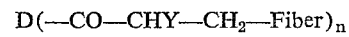

wherein D represents the chromophoric compound (e.g. organic dyestuff molecule), a nuclear carbon atom of which is bonded to the parenthetical group shown, Y is H, Cl or Br, "Fiber" is as defined above, and $n$ has an average value of 1 to 4.

As stated, any azo coupling component may be employed to provide the B component in the azo dystuffs of Formula IV above. The identity and characteristics of such coupling components have been well documented, as for example see volue I of Venkataraman, cited above, beginning at page 409. Generally, such compounds are capable of coupling by reason of an anionoid or nucleophilic center in the compound at which coupling with the diazo component takes place. An important group of azo coupling components are the carbocyclic and heterocyclic compounds containing a nuclearly substituted hydroxy or amino group directing coupling in ortho or para position thereto. Usually, the diazonium coupling reaction with these coupling components is explicable by a mechanism which is in consonance with the accepted theory of aromatic substitution. The yield in the coupling reaction depends on the electro-negativity and accessibility of the site in the carbocyclic or heterocyclic compound at which the attachment of the diazonium group is to take place and on the pH of the reaction mixture which may fall within the acid, neutral or basic range depending upon the particular coupling component employed. The diazonium group attacks a position which has been activated as a site of high electron density. Coupling therefore takes place in the ortho or para position to the directing hydroxyl or amino group in the coupling component. If both of these positions are occupied, no coupling will take place or one of the substituents will be displaced.

Another important group of azo coupling components are the heterocyclic compounds containing a reactive nuclear methylene group usually associated with an adjacent keto group (keto-methylene linkage) as in the 5-pyrazolones.

Still another important group of azo coupling components are the compounds containing an aliphatic or alicyclic keto-methylene group as in the acylacetic acid arylides and esters.

As examples of suitable azo coupling components falling within the above classifications, there may be mentioned aniline, toluidine, 2-naphthylamine, 2-naphthol, 1-amino-7-naphthol, and other amino and/or hydroxy-containing phenols and naphthols, pyrroles, indoles, 2-hydroxycarb azoles, 3-hydroxydibenzofurans, 2-naphthol-3-carboxylic acid arylamides, amino and hydroxy pyridines and pyrimidines, 2-,4-dihydroxyquinoline, 9-methylacridine, 5-pyrazolone, 1-phenyl-3-methyl-5-pyrazolone, 1-phenyl-5-pyrazolone-3-carboxylic acid, acetoacetic acid anilide, benzoylacetic acid anilide, and substituted, fused ring, and other derivatives thereof. Such coupling components may contain any desired auxochrome substituents, solubilizing groups, and the like.

In its preferred embodiment, the fiber-reactive chromophoric compounds of the present invention are water soluble (including ready dispersibility in water) to facilitate application thereof to the fiber from an aqueous medium. It is accordingly preferred that such fiber-reactive chromophoric compounds contain at least one ionogenic water-solubilizing group, preferably a sulfonic acid group although other such groups are known and may be employed as for example carboxylic, sulfato, sulfatoethoxy, phosphatoethoxy, and the like. Since the above described Friedel-Crafts reaction tends to attack and/or decompose water-solubilizing groups, it is generally necessary to insert the water-solubilizing group at a later stage in the production of the present fiber-reactive chromophoric compounds. Thus, in the production of the azo dyestuffs of Formula IV above, it is convenient to employ an azo coupling component B as described above containing such water-solubilizing group or groups. Alternatively, such water-solubilizing groups may be inserted subsequently and/or as a final step as by sulfonation in known manner, etc.

Fiber-reactive chromophoric compounds containing the fiber-reactive radical of the Formula I above wherein X is other than Cl or Br may be readily produced from the chromophoric compounds resulting from the above described Friedel-Crafts reaction of a β-chloropropionyl chloride with a suitable chromophoric compound, organic dyestuff or aromatic compound Ar by dehydrochlorination of such product in known manner to produce the corresponding vinyl ketone, hydrolysis of the vinyl ketone group to the corresponding hydroxyethyl group, and esterification of the hydroxy group to replace same by X, for example by esterification with sulfuric acid or pyridine-SO₃ complex to produce the corresponding compound wherein X is sulfato, or by esterification with any of the other acids having a dissociation constant greater than $2.0 \times 10^{-5}$ referred to above. By way of example, the product of Equation II above or its hydrolyzed product of Formula III above is dehydrochlorinated by warming in sodium acetate and xylene to produce the corresponding vinyl ketone having a formula:

(VII) 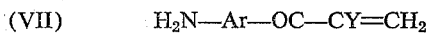

the vinyl ketone hydrolyzed by treatment with aqueous KOH in a water miscible organic solvent such as the dimethyl ether of ethylene glycol to produce the corresponding hydroxyethyl ketone of the formula:

(VIII) 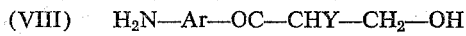

and the latter esterified as described above to produce the compound of formula:

(IX) 

It will be understood that the compound of Formula IX may generally be employed as and/or instead of the compound of Formula III above in the production of the described azo dyestuffs and other fiber-reactive chromophoric compounds described herein. It will also be understood that the compound of Formlua VIII above may be employed in the described reactions and esterification to replace the OH group by X may be carried out subsequently.

Still another method of making the fiber-reactive chromophoric compounds of the present invention involves reaction of the compound of Formula VIII with a chromophoric compound or dyestuff containing a reactive chlorine or bromine atom which may be nuclearly bound or present in a reactive radical such as a sulfonyl chloride group (—SO₂Cl), a chloromethyl group (—CH₂Cl), etc. in the presence of an acid binding agent, followed by esterification. For example, the compound of Formula VIII may be reacted with any reactive chlorine-containing compound adapted for subsequent conversion to a chromophoric compound or dyestuff in substance or on the fiber as for example a diazo component or an azo coupling component of an azo dyestuff, or with any known reactive chlorine-containing chromophoric compound or dyestuff of the type describde above. Thus, reaction of the compound of Formula VIII with bromamine acid, preferably in the presence of an acid binding agent, followed by esterification with HX or equivalent yields a fiber-reactive anthraquinone dyestuff operative herein having the formula:

(X)

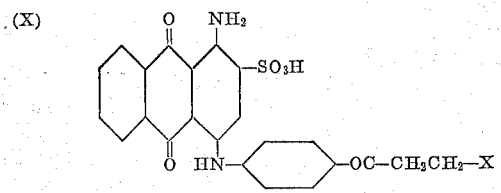

It will be understood that the phenylene ring in the above formula may be instead any other aromatic compound Ar of the type described above, as for example a divalent diphenyl, diphenyl ether, naphthalene, anthracene or other polycyclic aromatic compound, and lower alkyl and alkoxy substituted derivatives thereof (methyl, isobutyl, methoxy, butoxy, etc.).

Similarly, reaction of the two moles of a compound of the Formula VIII with one mole of tetrachlorosulfonated copper phthalocyanine followed by esterification with HX or equivalent yields, for example the compound of the formula:

(XI) 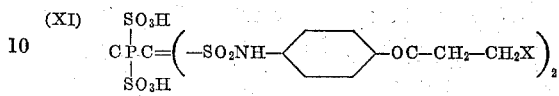

wherein CPC represents the copper phthalocyanine molecule.

In a similar manner, when two moles of β-chloropropionyl chloride are reacted with one mole of 1-acetylamino naphthalene by the Friedel-Crafts reaction, the resulting intermediate dehydrochlorinated and hydrolyzed as described above to produce a compound of Formula VIII, two moles of the latter compound reacted with one mole of bis-chloromethyl copper sulfophthalocyanine in the presence of an acid binding agent, and the resulting compound esterified with HX, there is produced a fiber-reactive water soluble phthalocyanine dyestuff of the formula (XII)

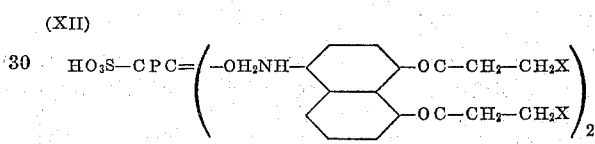

The fiber-reactive chromophoric compounds of the present invention are highly effective for coloring natural and synetheic fibers, preferably those containing an active H atom in the molecule, particularly cellulosic textile fibers, in any desired shades of good to excellent fastness and stability properties. The preferred coloring process involves dyeing (including printing) the fibrous materials by application thereto under acid-binding conditions of an aqueous medium containing a chromophoric compound of the invention (preferably water soluble) at any temperature ranging from ambient temperatures to the boiling point of the medium, said compound thereby reacting with the fiber with liberation of acid HX. The medium may have a pH ranging from about 4 to 14 although alkaline conditions are preferred. The medium may be applied in any desired manner, by continuous or batch methods and by immersion, roller application, padding, spraying, brushing, printing or the like. The aqueous medium is preferably a true or colloidal solution, but may also be in the form of a fine dispersion. It will accordingly be understood that the term "water soluble" as applied to the fiber-reactive chromophoric compounds herein is also intended to include ready water dispersibility, particularly since most such compounds and dyestuffs, though of high molecular weight and limited water solubility, are applied at relatively low concentrations to the fiber.

The fiber-reactive chromophoric compounds of this invention are applied to the fiber in any desired proportions depending upon the particular compound and fiber, and the depth of shade desired, generally ranging from about 0.5 to 5% based upon the weight of the fiber in the case of overall dyeings. Similarly, for overall dyeing of the fibrous material, the fiber-treating medium will generally contain the fiber-reacting chromophoric compound in a concentration ranging from about 0.5 to 10% or more.

It will be understood that the water in the above described aqueous medium may be replaced in whole or in part by a water miscible, polar organic solvent such as acetone, alcohol, dioxane, dimethylformamide, or the like without departing from the scope of this invention.

It will likewise be understood that the medium containing the reactive chromophoric compounds described above may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen-containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

The reaction between the reactive chromophoric compound and the fiber containing a reactive hydrogen atom involves liberation of acid HX and the reaction is accordingly favored by acid binding conditions. As acid binding agents which may be added to the medium containing the reactive chromophoric compound, there may be mentioned generally alkali metal (sodium, potassium, lithium, etc.) hydroxide, carbonate, bicarbonate, phosphate, silicate, borate, acetate or the like, or an organic base such as triethanolamine or the like, in an amount sufficient to neutralize the liberated HX in whole or in part. Such amount may range from less than 0.5% up to 10% in the dispersion.

Instead of adding the acid binding agent to the medium containing the fiber-reactive chromophoric compound, said agent may be applied to the fiber prior to or subsequent to treatment with said medium, the important factor being the treatment of the fibers with the fiber-reactive chromophoric compound in the presence of the acid binding agent. Alternatively, instead of the acid binding agent, a substance may be employed which liberates an acid binding agent upon subsequent subjection to elevated temperatures. An example of such a substance is sodium trichloroacetate, and the use of such a substance requires subsequent application of elevated temperatures as by dry heat or steam.

In carrying out the coloring process, the speed of reaction between the fiber and the fiber-reactive chromophoric compound will generally vary directly with the temperature. The fiber, for example in the form of a fabric, may be continuously padded with the fiber-treating medium, and then, if desired after a gentle squeezing, may be wound on a roller with alternating sheets of polyethylene film, and/or the entire roll wrapped in a polyethylene package, and the package held at room temperature or slightly higher until completion of the desired reaction between the fiber and the reactive chromophoric compound has taken place. This may require several hours or more. Alternatively, the fiber may be allowed to remain in the fiber-treating medium at room or elevated temperatures up to the boiling point of the medium until the coloring process is completed which may range from 20 minutes or less to several hours or more. Preferably, the fiber is continuously padded with the fiber-treating medium, squeezed, to for example, a 50 to 200% liquor pickup, dried and heated at 90 to 350° C. for an hour or more to 30 seconds or less. A dry heat treatment may be substituted by a steaming or the like if desired.

The process of this invention has been found to be highly effective for dyeing and printing cellulosic fibers of natural or synthetic type, such as cotton, linen, wood, paper, regenerated cellulose and the like in any desired shades of good to excellent fastness properties. As a result of the reactive dyeing process of this invention, such dyed or printed cellulose fibers are represented by Formula VI above wherein D, Y and $n$ have the values given above and "Fiber" represents a cellulose molecule deprived of a reactive hydrogen atom as originally present for example in hydroxy groups therein. It will be apparent that cross-linking exits with resultant increased fastness properties when $n$ has a value of 2 or more.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeings may be ascribed formulae similar to those of the cellulose dyeings described above. As representative of such other fibers, there may be mentioned natural and synthetic proteinaceous fibers such as wool, silk, leather, animal hides and skins, casein, and zein, polyamides such as the 6-, and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may be employed for dyeing other articles including film and sheet material, and other objects of any size, shape and configuration without departing from the spirit and scope of this invention.

The following examples are only representative of the present invention and are not to be regarded as limitative. All parts and proportions referred to herein and in the appended claims are by weight unless otherwise indicated.

*Example 1*

A. A charge of 100 parts by volume of symmetrical tetrachloroethane, 27.0 parts by weight acetanilide and 25.4 parts by weight β-chloropropionyl chloride is heated under a reflux condenser to 55° C. To the charge is added gradually at 55–59° C. under agitation over a period of 1½ hours 53. g. anhydrous aluminum chloride.

After all is introduced the charge is stirred at 55–60° C. for 7 hours. The mixture is poured at room temperature under agitation into ice and water and then shaken with some ether in which the reaction product is not soluble. After filtration the product is washed with water and dried. Ten parts by weight of the para-β-chloropropionyl-acetanilide so obtained are refluxed for 9 hours in a mixture of 50 parts by volume water and 25 parts by volume concentrated hydrochloric acid (36%).

After removal of small amounts of solid impurities by decantation the solution is cooled to 10° C. and made alkaline by slowly adding 20% sodium hydroxide solution at temperatures below 10° C. A precipitate of the corresponding p-β-chloropropionyl-aniline is obtained. It is filtered, washed with water and sucked dry on the filter at room temperature.

B. 4.6 parts by weight of the base obtained in A above are dissolved in a mixture of 50 parts by volume water and 6.4 parts by volume concentrated hydrochloric acid (36%%) and diazotized at 0–5° C. with 14 parts by volume 10% (weight/volume) sodium nitrite solution.

C. The above diazonium solution is stirred into a cold solution (0–5° C.) of 100 parts by volume water, 6.5 parts by weight H acid (1-amino-8-naphthol-3,6-disulfonic acid) and 25 parts by volume 20% sodium hydroxide solution. The dyestuff is salted out by the addition of 20 parts by volume sodium chloride. It has the formula

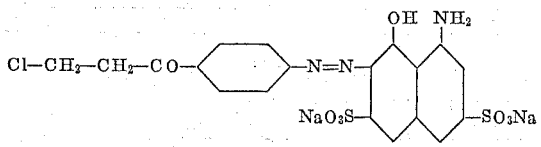

D. The above dyestuff is padded on cotton from a dye bath containing 2% urea and alkalized with NaOH. The padded cloth is dried, heat-set for 3 minutes at 310° F., rinsed and washed with detergent. A violet dyeing is obtained with good fastness properties.

Example 2

A procedure similar to that of Example 1C is employed to couple N-acetyl H acid (1-actylamino-8-naphthol-3,6-disulfonic acid) with the diazotized compound of Example 1B. The dyestuff has the formula

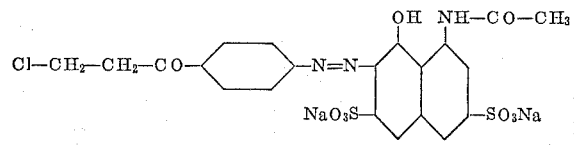

When the above dyestuff is applied to cotton as described is example 1D, a pink dyeing with good fastness properties is obtained.

Example 3

A procedure similar to that of Example 1C is employed to couple 1-(4-sulfophenyl)-3-methyl-5-pyrazolone with the diazotized compound of Example 1B. The resulting dyestuff has the formula

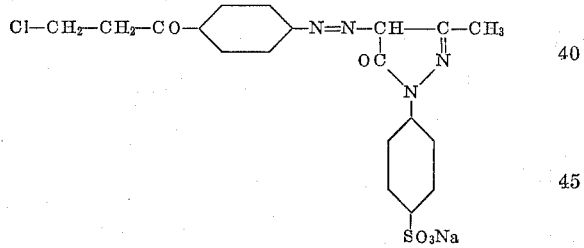

When the above dyestuff is applied to cotton as described in Example 1D, a yellow dyeing with good fastness properties is obtained.

Example 4

A procedure similar to that of Example 1C to couple N-chloroacetyl H acid (1-chloroacetylamino-8-naphthol-3,6-disulfonic acid) with the diazotized compound of Example 1B is employed. The resulting dyestuff has the formula

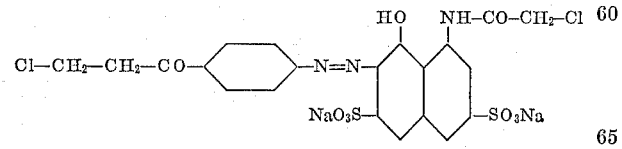

When the above dyestuff is applied to cotton as described in Example 1D, except for substitution of a curing temperature of 340–350° F., a maroon dyeing with good fastness properties is obtained.

Example 5

A procedure similar to that of Example 1C is employed to couple N-β-chloropropionyl H acid (1-β-chloropropionylamino-8-naphthol-3,6-disulfonic acid) with the diazotized compound of Example 1B. The resulting dyestuff has the formula

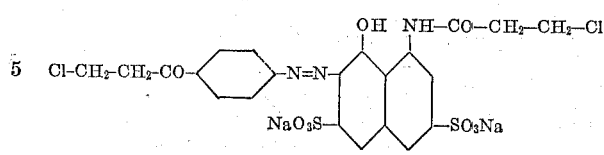

When the above dyestuff is applied to cotton as described in Example 1D except for substitution of a curing temperature of 300° F., a violet-tinted red dyeing with good fastness properties is obtained.

This invention has been disclosed with respect to certain preferred embodiments and various modifications and variations thereof will become obvious to the person skilled in the art. It is to be understood that such modifications and variations are to be included within the spirit and scope of this invention.

We claim:
1. A water soluble organic dyestuff of the formula

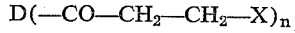

wherein D is selected from the group consisting of water, soluble azo, anthraquinone and phthalocyanine dyestuff moieties and is joined through a nuclear carbon atom thereof to the depicted parenthetical radical; X is the anion of a strong acid having a dissociation constant greater than $2.0 \times 10^{-5}$ and selected from group consisting of sulfuric, hydrochloric, hydrobromic, hydrofluoric, iodic, phosphoric phosphonic, phosphinic, organic sulfonyloxy, trichloroacetic, dichloroacetic, chloroacetic, and formic acids; and $n$ is an integer of 1 to 4.
2. A dyestuff as defined in claim 1 wherein X is Cl.
3. A dyestuff as defined in claim 1 wherein X is $OSO_3H$.
4. An azo dyestuff as defined in claim 1.
5. An anthraquinone dyestuff as defined in claim 1.
6. A phthalocyanine dyestuff as defined in claim 1.
7. A dyestuff of the formula

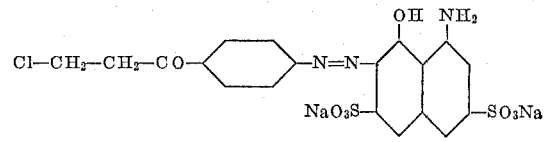

8. A dyestuff of the formula

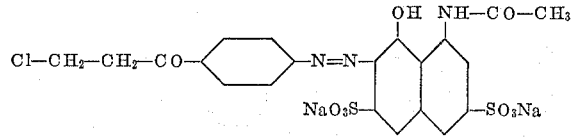

9. A dyestuff of the formula

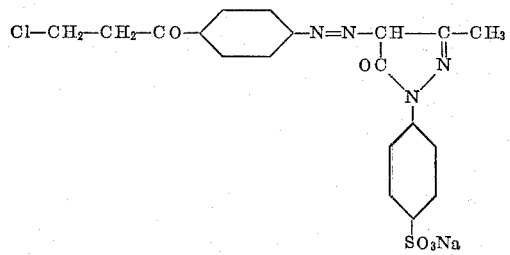

10. A dyestuff of the formula

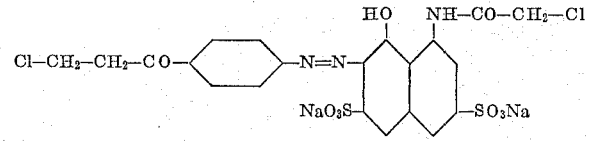

11. A dyestuff of the formula

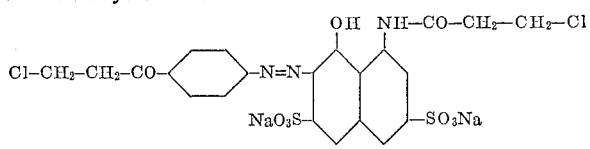

References Cited by the Examiner
UNITED STATES PATENTS

| | | | |
|---|---|---|---|
| 1,886,480 | 11/1932 | Haller et al. | 8—54.2 X |
| 2,128,255 | 8/1938 | Krzikalla et al. | 260—199 |
| 2,332,047 | 10/1943 | Bock et al. | 8—124 |
| 2,339,739 | 1/1944 | Blackshaw et al. | 8—54.2 |
| 2,350,188 | 5/1944 | Pinkney | 8—54.2 |
| 2,670,265 | 2/1954 | Heyna et al. | 260—160 |
| 2,728,762 | 12/1955 | Heyna et al. | 260—163 |
| 2,743,267 | 4/1956 | Heyna et al. | 260—163 X |
| 2,842,537 | 7/1958 | Strobel et al. | 260—163 |
| 2,906,747 | 9/1959 | Wolfrum | 260—163 |
| 3,007,762 | 11/1961 | Wegmann et al. | 260—199 |

FOREIGN PATENTS

| | | |
|---|---|---|
| 567,435 | 11/1958 | Belgium. |
| 779,781 | 7/1957 | Great Britain. |

OTHER REFERENCES

Wegmann: "Textile-Praxis," October, 1958, pp. 1056–1061.

CHARLES B. PARKER, *Primary Examiner.*

NORMAN G. TORCHIN, *Examiner.*